(12) United States Patent
Herbolzheimer et al.

(10) Patent No.: US 11,390,138 B2
(45) Date of Patent: Jul. 19, 2022

(54) CONTROL SYSTEM FOR A HEATING SYSTEM AND METHOD FOR OPERATING A HEATING SYSTEM

(71) Applicant: Bayerische Motoren Werke Aktiengesellschaft, Munich (DE)

(72) Inventors: Robert Herbolzheimer, Groebenzell (DE); Oliver Horn, Munich (DE); Patrick Oswald, Munich (DE); Markus Stix, Taufkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 194 days.

(21) Appl. No.: 16/824,142

(22) Filed: Mar. 19, 2020

(65) Prior Publication Data

US 2020/0298653 A1    Sep. 24, 2020

(30) Foreign Application Priority Data

Mar. 20, 2019    (DE) ...................... 10 2019 107 192.5

(51) Int. Cl.
*F28F 27/00*    (2006.01)
*B60H 1/00*    (2006.01)
*B60H 1/32*    (2006.01)

(52) U.S. Cl.
CPC ..... *B60H 1/00392* (2013.01); *B60H 1/00278* (2013.01); *B60H 1/00735* (2013.01);
(Continued)

(58) Field of Classification Search
CPC ............ B60H 1/00392; B60H 1/00278; B60H 1/00735; B60H 1/00885; B60H 1/3204; B60H 1/3225; B60H 2001/3267
(Continued)

(56) References Cited

U.S. PATENT DOCUMENTS

2015/0191072 A1    7/2015  Inoue et al.
2016/0339767 A1*   11/2016  Enomoto ........... B60H 1/00278
(Continued)

FOREIGN PATENT DOCUMENTS

DE    11 2013 003 562 T5    4/2015
DE    10 2015 218 825 A1    3/2017
JP       2018-185104 A     11/2018

OTHER PUBLICATIONS

German-language Search Report issued in German Application No. 10 2019 107 192.5 dated Oct. 4, 2019 with partial English translation (13 pages).

*Primary Examiner* — Davis D Hwu
(74) *Attorney, Agent, or Firm* — Crowell & Moring LLP

(57) ABSTRACT

A control system for a heating system of an electric or hybrid vehicle with a coolant cooled high voltage store. The control system includes an air conditioning evaporator of a refrigeration circuit of the heating system through which refrigerant circulates to cool the passenger compartment when a cooling requirement for a passenger compartment of the vehicle and for which an air conditioning cooling mode is set. The system further includes a chiller to cool the high voltage store when a cooling requirement for the high voltage store of the vehicle and for which a high voltage store (HVS) cooling mode is set. The control system selects the regulating variable for the compressor from a plurality of different regulating variables based on whether the air conditioning cooling mode is set, whether the HVS cooling mode is set, and/or whether both the air conditioning cooling and HVS cooling modes are set.

15 Claims, 2 Drawing Sheets

(52) U.S. Cl.
CPC ....... *B60H 1/00885* (2013.01); *B60H 1/3204* (2013.01); *B60H 1/3225* (2013.01); *B60H 2001/3267* (2013.01)

(58) Field of Classification Search
USPC ......................................................... 165/202
See application file for complete search history.

(56) References Cited

U.S. PATENT DOCUMENTS

2018/0134123 A1    5/2018   Herbolzheimer et al.
2021/0101451 A1*   4/2021   Kobayashi ......... B60H 1/00278

* cited by examiner

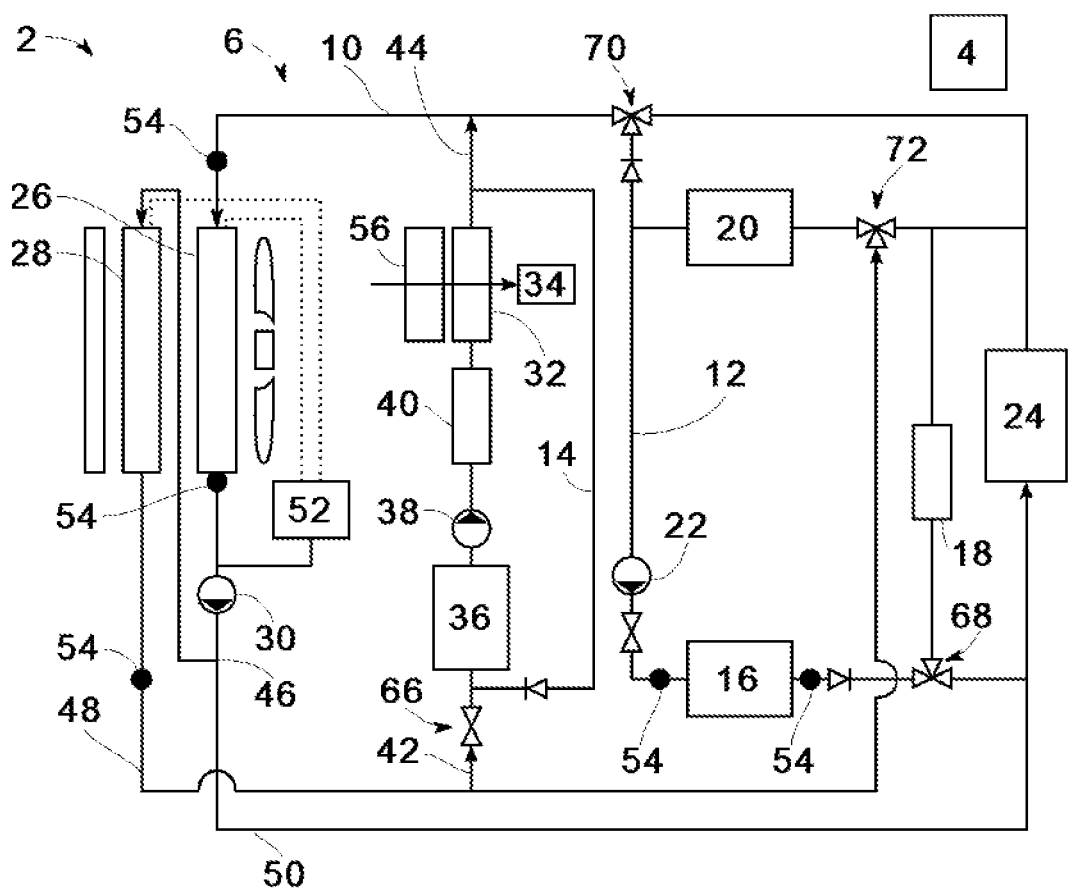
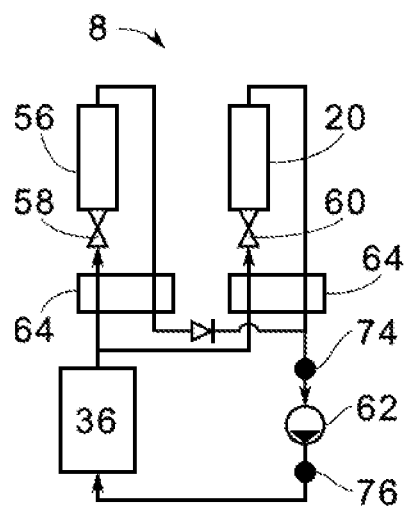 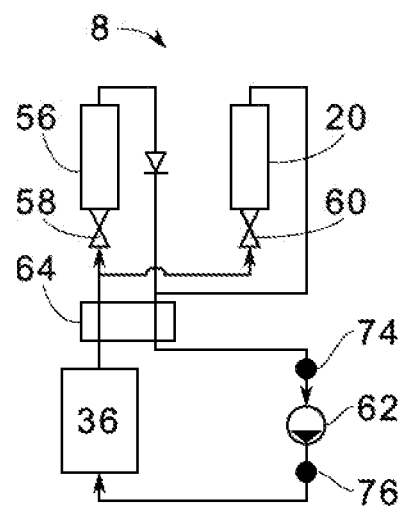
Fig. 1
Fig. 2
Fig. 3

CONTROL SYSTEM FOR A HEATING SYSTEM AND METHOD FOR OPERATING A HEATING SYSTEM

CROSS REFERENCE TO RELATED APPLICATION

This application claims priority under 35 U.S.C. § 119 from German Patent Application No. 10 2019 107 192.5, filed Mar. 20, 2019, the entire disclosure of which is herein expressly incorporated by reference.

BACKGROUND AND SUMMARY OF THE INVENTION

The present subject matter relates to a control system for a heating system of an electric or hybrid vehicle, and to a method for operating such a heating system by means of such a control system.

A heating system generally serves for controlling the temperature of diverse components which are connected for this purpose to the heating system. Especially in an electric or hybrid vehicle, such components are a passenger compartment of the vehicle, a high voltage store of the vehicle, and one or more heat sources of an electric drive train of the vehicle, for example, an electric engine or power electronics, or the like. The heating system is generally operable in diverse operating states in order to satisfy the respective temperature control requirements of the individual components. A general problem is the presence of a plurality of components which simultaneously produce diverse temperature control requirements.

DE 10 2015 218 825 A1 describes a control system which permits a heating mode and a cooling mode for a passenger compartment of a vehicle. In the heating mode, heat can be absorbed from the environment by means of a heat pump and used via a heating heat exchanger to heat the passenger compartment. By contrast, in the cooling mode, the heat pump is deactivated and an air-conditioning evaporator activated, to cool the passenger compartment. The heat pump comprises a chiller which is connected together with the air-conditioning evaporator in a refrigeration circuit. In addition to the chiller and to the air-conditioning evaporator, a further evaporator is also connected to the refrigeration circuit, to cool a high voltage store of the vehicle.

Against this background, the disclosed subject matter specifies an improved control system for a heating system. The intention is furthermore to specify an improved method for operating a heating system. The intention is to carry out cooling of a high voltage store of a vehicle by means of coolant as efficiently as possible. At the same time, the intention is also for air-conditioning of the passenger compartment as efficiently and suitably as possible, by means of a heat pump.

The statements in conjunction with the control system also apply analogously to the method, and vice versa.

The control system serves for controlling a heating system of an electric or hybrid vehicle, which is referred to below merely as vehicle for short. The vehicle has a coolant-cooled high voltage store. For control purposes, the control system is combined with the heating system, i.e. is connected thereto. It is understood that the control system manipulates and sets the heating system by means of a number of actuating elements. The heating system has a number of components for air-conditioning the vehicle. Said components are then controlled or regulated, or both, by the control system and are therefore actuating elements of the control system. In this context, the vehicle is air-conditioned by means of the control system controlling or regulating the heating system, or both.

It is essential here that the compressor is regulated and is not merely controlled or simply set to a constant compressor rotational speed.

The control system is designed such that, when a cooling requirement for a passenger compartment of the vehicle, an air-conditioning cooling mode of the heating system is set, for cooling the passenger compartment by means of an air-conditioning evaporator of a refrigeration circuit of the heating system, and that, when a cooling requirement for the high voltage store of the vehicle, a high voltage store (HVS) cooling mode of the heating system is set, for cooling the high voltage store by means of a chiller of the heating system. An expansion valve is connected in the refrigeration circuit upstream of the chiller, by means of which expansion valve the heat absorbed by the chiller in the refrigeration circuit can be set. The air-conditioning cooling mode and the HVS cooling mode are each an operating mode of the heating system. During the operation of the heating system, cooling requirements for the passenger compartment and the high voltage store can therefore be satisfied independently of one another and especially also simultaneously by the respective operating mode being activated, i.e. set. In addition, in one variant, one or more further operating modes can be set.

Furthermore, the control system is designed such that the refrigeration circuit of the heating system is activated depending on whether the air-conditioning cooling mode or the HVS cooling mode or both are set simultaneously. In other words: a control or regulation of one or more components of the refrigeration circuit is realized, in which the refrigeration circuit is activated by means of the control system in order optimally to satisfy the respective cooling requirements, and the control is adapted depending on which operating modes are set and which are not set. Depending on the operating mode, the components are thereby controlled or regulated, or a combination thereof, depending on the operating mode. The refrigeration circuit is therefore optimally set to an overall situation at a given time, wherein the overall situation is defined by the sum of all of the activated operating modes. Possible conflicts of objectives in the distribution of power to different temperature control tasks are thereby resolved particularly effectively and in a manner adapted to the situation. For all intents and purposes, an operating-mode-dependent control and/or regulation takes place.

Specifically, in the present case, when a simultaneous HVS cooling mode and air-conditioning cooling mode, a compressor of the refrigeration circuit is regulated with a regulating variable which is a setpoint air temperature at the air-conditioning evaporator. The refrigeration power of the refrigeration circuit is thereby regulated depending on the cooling requirement for the passenger compartment. Furthermore, when a simultaneous HVS cooling mode and air-conditioning cooling mode, the expansion valve is now activated depending on the regulating variable for the compressor, or, when the HVS cooling mode without an additional air-conditioning cooling mode for the compressor, another regulating variable is used, or both. Proceeding from the regulation of the compressor to the setpoint air temperature when a simultaneous HVS cooling mode and air-conditioning cooling mode, the distribution of the refrigeration power is therefore optimized. A first optimization is achieved by the fact that, when a simultaneous HVS cooling mode and air-conditioning cooling mode, the expansion valve is also activated depending on the setpoint air temperature. A second optimization is achieved by the fact that, when the air-conditioning cooling mode ceases, i.e. when the HVS cooling mode without an additional air-conditioning cooling mode, the compressor is regulated to another regulating variable which is now not, like the setpoint air temperature, configured to the air-conditioning cooling mode, but rather to the HVS cooling mode. The two optimizations are combined. Overall, the distribution of the refrigeration power is therefore improved in a coolant-cooled high voltage store in competition with the cooling of the passenger compartment.

The disclosed subject matter is based on the concept that, by switching over the activation of the refrigeration circuit, the operation thereof can be optimally adapted to the temperature control requirements at a given time. Instead of operating the refrigeration circuit independently of the operating modes of the heating system, a distinction is now advantageously made as to in which combination various operating modes are active. In response thereto, a corresponding regulator or a corresponding control is activated. Conflicts of objectives between diverse temperature control requirements can thereby be advantageously resolved. In addition, depending on the overall situation of the heating system, a certain operating mode can advantageously be prioritized over another operating mode. A further advantage is that, for a given overall situation, especially if only one individual operating mode is activated, but also in general, a respectively optimal regulation of the refrigeration circuit takes place.

In the present case, the term control system is also understood as meaning a regulating system or a control and regulating system. Similarly, the term "to control" is understood here in general and also comprises "to regulate", unless explicitly stated otherwise. "Temperature control" is understood here as meaning cooling, heating or both. Accordingly, cooling requirements and heating requirements are also referred to in general as temperature control requirements.

Overall, the behavior of the heating system is decisively determined by the temperature control requirement which results, for example, from a specific user input via an operating element of the control system or which takes into consideration environmental conditions which are determined by means of suitable sensors of the control system, for example temperature sensors for measuring the external temperature or the temperature in the passenger compartment of the vehicle, the temperature of a high voltage store of the vehicle or at certain points of the heating system. Alternatively or additionally, a temperature control requirement imposed on the control system is determined by a higher-level master control system, for example an air-conditioning function logic. The control system described here is then a subsystem of the higher-level master control system.

Of particular importance are temperature control requirements regarding the passenger compartment of the vehicle, for example heating required by the user, and especially, in the case of an electric or hybrid vehicle, a temperature control requirement regarding the high voltage store. A temperature control requirement arises depending on the external temperature as an expression of the weather and the environmental conditions. Automatic and optimum control and regulation of the individual components and of the entire heating system per se in a manner suitable for requirements takes place by means of the control system by suitable linking of the temperature control requirement in the form of predetermined or determined parameters which describe the temperature control requirement to suitable control and regulating concepts for manipulating the heating system, here especially the refrigeration circuit. The entire heating system can basically be considered here to be part of the control system, but at least individual components of the heat pump system are part of the control system.

A refrigerant circulates in the refrigeration circuit. The compressor of the refrigeration circuit is an electric refrigerant compressor, ERC for short. The compressor is arranged downstream of the air-conditioning evaporator and the chiller and upstream of a condenser. The chiller and the air-conditioning evaporator each act as an evaporator and transmit heat into the refrigeration circuit, whereas the condenser serves for removing heat from the refrigeration circuit. The evaporators are expediently connected parallel to each other in the refrigeration circuit and, as a result, refrigerant can flow through them independently of each other. An expansion valve is arranged upstream of a respective evaporator, said expansion valve being opened in order to activate the evaporator and being closed in order to deactivate the evaporator. The term "expansion valve" as used herein refers to the expansion valve upstream of the chiller, unless stated otherwise.

The high voltage store serves for supplying the electric drive of the vehicle with electrical energy and is designed in a corresponding manner for this purpose. The high voltage store conventionally has a multiplicity of cells which are electrically connected to one another. In addition, it is also possible to extract electrical energy for supplying other vehicle components from the high voltage store. The high voltage store is alternatively also referred to as an electric store or as a battery.

In the present case, the high voltage store is coolant-cooled and, for this purpose, is connected to an overall cooling circuit of the heating system and is cooled in the HVS cooling mode by means of the chiller. The overall cooling circuit serves for circulating a coolant, for example a water/glycol mixture, and the high voltage store is therefore coolant-cooled and optionally also heated, depending on the temperature management of the coolant. The high voltage store is arranged in a HVS circuit which is part of the overall cooling circuit. The chiller is likewise arranged in the HVS circuit, expediently downstream of the high voltage store. By activation of the chiller, i.e. by opening the expansion valve, heat is then transferred from the HVS circuit into the refrigeration circuit and the high voltage store is cooled. The HVS circuit can be shut off from the rest of the overall cooling circuit such that, in a shut-off state, the coolant in the HVS circuit does not mix with the coolant from the remaining overall cooling circuit. Conversely, in a connected state, coolant is exchanged. An environment cooler for exchanging heat with the environment is arranged in a cooling circuit of the overall cooling circuit. In the connected state, the high voltage store is then cooled via the environment cooler. A combined cooling both by means of the environment cooler and the chiller is also possible, by the heating system being set such that the high voltage store, the chiller and the environment cooler are connected in series.

The air-conditioning evaporator is part of an air-conditioning apparatus of the vehicle. A further part of the air-conditioning apparatus is a heating heat exchanger which is arranged in a heating circuit of the overall cooling circuit. The heating circuit is operable independently of the cooling circuit and of the HVS circuit but is hydraulically connected to the cooling circuit. Like, the HVS circuit, the heating circuit can be shut off in order, depending on the operating mode, to exchange or not to exchange coolant with the remaining overall cooling circuit. A temperature control requirement for the passenger compartment of the vehicle is satisfied by the fact that a suitable operating mode is set depending on the temperature control requirement. If the temperature control requirement comprises a cooling requirement, the passenger compartment is cooled by means of the air-conditioning evaporator. If the temperature control requirement comprises a heating requirement, the passenger compartment is heated by means of the heating heat exchanger. When a dehumidification requirement for dehumidifying the passenger compartment, both a heating requirement and a cooling requirement are present simultaneously. A configuration in which different zones or regions of the passenger compartment, for example, footwell and ventilation plane, are air-conditioned differently. In this case, both a heating requirement and a cooling requirement are then regularly likewise present. The air-conditioning evaporator and the heating heat exchanger are arranged together in an air path through which passenger compartment air, i.e. air which is supplied to the passenger compartment, flows during the operation. The passenger compartment air then exchanges heat with the air-conditioning evaporator and the heating heat exchanger correspondingly, depending on the operating mode. The air path can be shut off. In a shut-off state, no temperature control of the passenger compartment takes place.

In an advantageous refinement, the control system is designed such that when a heating requirement for the passenger compartment of the vehicle, an air-conditioning heating mode of the heating system is set for heating the passenger compartment. Heat is transmitted into the heating circuit of the heating system by means of a heat pump. The heat pump is formed by the chiller in combination with a condenser in the heating circuit. The abovementioned heating heat exchanger is supplied with heat in the heating circuit via the heat pump. Alternatively, heating of passenger compartment air directly by means of the condenser is also suitable. The chiller is arranged in the HVS circuit and outside the heating circuit. The condenser is arranged in the heating branch upstream of the heating heat exchanger.

In order to circulate the coolant in the overall cooling circuit, suitable pumps are connected. A dedicated pump is connected in each of the individual circuits of the overall cooling circuit, namely a cooling circuit pump in the cooling circuit, a heating circuit pump in the heating circuit, and a HVS circuit pump in the HVS circuit.

When a cooling requirement for the passenger compartment without an additional heating requirement for the passenger compartment, the heating circuit is opened, the chiller of the heat pump is deactivated, and an air-conditioning cooling mode is thereby set. The air-conditioning evaporator absorbs heat from the passenger compartment air and transfers said heat via the condenser into the heating circuit, to the environment cooler in the cooling circuit, and to the environment. In the converse situation, where a heating requirement exists without an additional cooling requirement, the heating circuit is closed. Heat is supplied to the heating heat exchanger via the condenser of the heat pump and an air-conditioning heating mode is thereby set. The heat originates here from the environment and is absorbed via the environment cooler or originates from a component which is connected to the overall cooling circuit and serves as a heat source. Alternatively or additionally thereto, the passenger compartment may be heated in the air-conditioning heating mode to transfer waste heat from the high voltage store into the heating circuit by means of the heat pump. This may occur whenever the high voltage store is intended to be cooled.

The simultaneous cooling of the high voltage store and of the passenger compartment constitutes a particular challenge since both the HVS cooling mode and the air-conditioning cooling mode are activated, and therefore, two evaporators are operated simultaneously in the refrigeration circuit. In this situation, the air-conditioning evaporator and the chiller compete for the refrigeration power that is applied by the refrigeration circuit, especially by the compressor. The compressor is operated at a certain compressor rotational speed. This can be set in order to set the refrigeration power that is available overall. The division of the refrigeration power between the air-conditioning evaporator and the chiller arises through the ratio of the openings of the two expansion valves upstream of the air-conditioning evaporator and the chiller. An expansion valve which can be shut off and can be controlled electrically, EXV for short, is connected upstream of the chiller here. By contrast, a thermal expansion valve, TXV for short, which is simple and cost-effective in comparison thereto, is connected upstream of the air-conditioning evaporator. The use of other expansion valves or combinations is possible.

Expediently, two situations are distinguished here, namely the combined operation of the two evaporators when a simultaneous HVS cooling mode and air-conditioning cooling mode, and the operation of the chiller alone, i.e. the heat pump, when the HVS cooling mode without the air-conditioning cooling mode.

In an advantageous refinement, the control system is designed such that the expansion valve is regulated with a superheating of the refrigerant in the refrigeration circuit as the regulating variable. In this case, the HVS cooling mode is set, but the air-conditioning cooling mode is not. For this purpose, the control system has a corresponding regulator. In the pure HVS cooling mode, i.e. without the air-conditioning cooling mode, all of the refrigeration power is used for cooling the high voltage store. The refrigeration power itself is set by means of the compressor rotational speed, likewise within the scope of a regulation. The expansion valve is then regulated with the superheating as the regulating variable to a setpoint superheating as a guide variable. An opening of the expansion valve serves as the actuating variable. Regulation of the expansion valve accordingly sets a certain superheating of the refrigerant upstream of the compressor and therefore the refrigerant mass flow and ultimately the power of the heat pump, i.e. the quantity of heat transmitted from the refrigeration circuit into the heating branch by the heat pump. The air-conditioning evaporator is deactivated by the associated expansion valve being shut off, i.e. closed. The same procedure is generally selected if the chiller is active and the air-conditioning evaporator is not, i.e. also whenever the heat pump is activated, for example, for heating the passenger compartment in the air-conditioning heating mode.

In the pure air-conditioning cooling mode, i.e. without the HVS cooling mode, the compressor rotational speed and therefore also the refrigeration power are regulated depending on the air temperature, which is also referred to as the actual air temperature. For this purpose, the control system has a corresponding regulator to which the air temperature is supplied as the regulating variable and a setpoint air temperature as the guide variable. The actuating variable is the compressor rotational speed. The refrigeration power is therefore effectively set depending on the cooling requirement for the passenger compartment. The expansion valve of the air-conditioning evaporator is not regulated by means of the control system described, not unregulated, but rather is self-regulating. For this purpose, the expansion valves has, for example, a dedicated, internal thermostatic regulator. The expansion valve of the chiller is closed. In the pure air-conditioning heating mode, i.e. without an additional HVS cooling mode and without an additional air-conditioning cooling mode, the compressor is regulated depending on a heating circuit temperature. That is, the temperature of the coolant in the heating circuit upstream of the heating heat exchanger and downstream of the condenser. For this purpose, the control system suitably has a corresponding regulator to which the heating circuit temperature is supplied as the regulating variable and a setpoint heating circuit temperature, also referred to as the heating circuit setpoint temperature, as the guide variable. The actuating variable is the compressor rotational speed.

If, however, both the air-conditioning cooling mode and the HVS cooling mode are active, the expansion valve of the chiller is advantageously regulated depending on the air temperature. For this purpose, the control system is expediently designed such that, when a simultaneous HVS cooling mode and air-conditioning cooling mode, the expansion valve is activated depending on the regulating variable for the compressor by a difference between an air temperature at the evaporator and the setpoint air temperature being used as a control variable for the expansion valve. The difference is also referred to as a regulating deviation of the air temperature. This is based on the consideration that, when an additional activation of the chiller, some of the refrigeration power is used for cooling the high voltage store and in this respect is extracted from the cooling of the passenger compartment. Owing to the regulation of the compressor in conjunction with the air-conditioning cooling mode, a corresponding compensation optionally takes place by increasing the compressor rotational speed. This regulation of the compressor depending on the air temperature first of all ensures that the cooling requirement for the passenger compartment is optimally satisfied. The cooling of the high voltage store additionally takes place for this purpose depending on the air temperature such that an optimum cooling of the passenger compartment continues to be ensured. Owing to the branching off of refrigeration power for the high voltage store, undesirable deficits in the cooling of the passenger compartment may occur, this being avoided by controlling the expansion valve of the chiller depending on the air temperature. A certain comfort in the passenger compartment is thereby advantageously ensured. The expansion valve is controlled here such that it is opened ever further for as long as the air temperature lies within a maximum deviation from a setpoint air temperature. In other words: the difference of air temperature and setpoint air temperature determines the opening of the expansion valve and therefore the amount of refrigeration power, which is used for cooling the high voltage store. For the opening, a dynamic is realized here such that, below a predetermined upper limit for the difference, the opening does not remain constant, but rather is opened ever further. The HVS cooling mode is therefore first of all subordinate to the air-conditioning cooling mode.

In an advantageous refinement, the control system is designed such that, when that the HVS cooling mode in combination with the air-conditioning cooling mode is set, a minimum opening of the expansion valve is set, and that the expansion valve is opened ever further starting from the minimum opening, specifically depending on a difference of the air temperature and the setpoint air temperature or on a cell temperature of the high voltage store, or on both. If the difference is used, this corresponds to the difference already described above, i.e. the regulating deviation with respect to the air temperature. As described, when the combination of the cooling modes, the cooling of the high voltage store is first of all subordinate because of the regulation depending on the air temperature. By setting the minimum opening, a minimum cooling for the high voltage store is now advantageously ensured. The expansion valve is therefore opened at least with the minimum opening, i.e. during the closing, the opening is reduced at maximum to the minimum opening. Starting from the minimum opening, the expansion valve is then first of all opened further if the air temperature corresponds to the setpoint air temperature within a permissible deviation and if further cooling is necessary because of the cell temperature. As a result, it is first of all ensured that the air-conditioning cooling mode is optimally carried out before further refrigeration power is then used for the HVS cooling mode.

In an advantageous refinement, the air-conditioning cooling mode is prioritized over the HVS cooling mode by the expansion valve being opened further only whenever a regulating deviation of the air temperature lies within a maximum deviation. The regulating deviation corresponds to the difference between the air temperature, which is an actual air temperature, and the setpoint air temperature. The maximum deviation indicates which extent of deviation with respect to the air temperature is still acceptable and which losses of comfort in the passenger compartment are still tolerable. Starting from a minimum cooling for the high voltage store, first of all the air-conditioning cooling mode is therefore prioritized over the HVS cooling mode. Only when the cooling requirement for the passenger compartment is met is then more refrigeration power shared with the chiller, by further opening of the expansion valve thereof, in order to more greatly cool the high voltage store, if there is a need in this regard. If the cooling of the high voltage store leads to too low a cooling of the passenger compartment and, as a result, the regulating deviation becomes greater, when the maximum deviation is exceeded the opening of the expansion valve is reduced and the cooling of the high voltage store withdrawn in favor of the cooling of the passenger compartment.

In an advantageous refinement, the control system is designed such that, if a cell temperature of the high voltage store exceeds a maximum temperature, the HVS cooling mode is prioritized over the air-conditioning cooling mode by the maximum deviation being increased. This serves for protecting the high voltage store against too high a cell temperature and against corresponding damage or aging effects. This is advantageous, for example, in order to avoid degradation of the high voltage store or else during rapid charging of the high voltage store since a particularly large amount of waste heat is regularly produced in this case by the latter. Accordingly, in such situations, the HVS cooling mode is expediently prioritized. If the maximum temperature is exceeded, the control of the expansion valve is assisted by raising the permitted regulating deviation for the air temperature. For example, the regulating deviation is extracted from a characteristic diagram depending on the cell temperature. Losses in comfort are consciously accepted by the changed control in order to protect the high voltage store. Accordingly, the prioritization of the air-conditioning cooling mode over the HVS cooling mode is cancelled and, conversely, the HVS cooling mode is prioritized over the air-conditioning cooling mode.

Alternatively or additionally to the operating-mode-dependent control of the expansion valve, the compressor is regulated depending on the operating mode. The regulation described below of the compressor is combined with the previously described regulation of the expansion valve, but is basically also already advantageous by itself.

In a suitable refinement, in order to regulate the compressor, a suction pressure in the refrigeration circuit upstream of the compressor is used as the regulating variable, if the HVS cooling mode is set, but the air-conditioning cooling mode is not, and neither is an air-conditioning heating mode. This regulation to the suction pressure accordingly takes place merely in the pure HVS cooling mode. If the air-conditioning cooling mode is set, irrespective of whether the HVS cooling mode is active or not, the regulating variable for regulating the compressor is, by contrast, not the suction pressure, but rather, as described above, an air temperature at the air-conditioning evaporator. For the regulation to the suction pressure, the control system has a further regulator. The regulation is therefore switched over depending on the operating mode. If no temperature control of the passenger compartment is required in the HVS cooling mode, the compressor is accordingly activated depending on the suction pressure, i.e. depending on the pressure of the refrigerant upstream of the compressor. Alternatively, for such a situation, simple control by setting a constant compressor rotational speed or a compressor rotational speed depending on the external temperature or the cell temperature of the high voltage store is also suitable. However, by contrast, the regulation to a specific suction pressure is more efficient and permits a higher refrigeration power. In a suitable refinement, in the pure HVS cooling mode, the compressor is activated via the suction pressure; in all other cases, by contrast, via the air temperature at the air-conditioning evaporator. However, in every case, the compressor rotational speed is the actuating variable. The suction pressure is measured by means of a pressure sensor in the refrigeration circuit upstream of the compressor.

Alternatively to the suction pressure regulation, in an advantageous refinement, in order to regulate the compressor, a coolant temperature upstream of the high voltage store is used as the regulating variable, if the HVS cooling mode is set, but the air-conditioning cooling mode is not. As also in the case of the suction pressure regulation already described, the control variable for the situation in which the air-conditioning cooling mode is set is the setpoint air temperature at the air-conditioning evaporator. The statements regarding the suction pressure as the regulating variable also apply generally analogously to the coolant temperature as the regulating variable. The regulator for this purpose is correspondingly modified. Also in this case, greater efficiency and refrigeration power suitable for requirements arise in comparison to a simple regulation to the compressor rotational speed. The coolant temperature in the HVS circuit upstream of the high voltage store is measured by means of a temperature sensor in the HVS circuit upstream of the high voltage store.

Expediently, the compressor is regulated when the pure HVS cooling mode by means of a regulator to which a suction pressure or the coolant temperature is supplied, i.e. in general an actual value, as a regulating variable and a setpoint suction pressure or a setpoint coolant temperature, i.e. in general a setpoint value, as a guide variable. The actual value is measured as described above by means of a suitable sensor. The setpoint value is fixedly predetermined in a particularly simple refinement. In an advantageous refinement, the control system is designed such that, at least in the situation in which the HVS cooling mode is set, but the air-conditioning cooling mode is not, the setpoint value for regulating the compressor is, however, extracted from a characteristic diagram. The characteristic diagram contains the setpoint value as a function of the external temperature or a cell temperature of the high voltage store or as a function of both. The cell temperature is measured by means of a temperature sensor in the high voltage store.

Overall, a refinement is produced by combining the described means of activating the refrigerant circuit, specifically the expansion valve and the compressor, such that, in the HVS cooling mode without the air-conditioning cooling mode, the expansion valve is regulated to the superheating of the refrigerant and the compressor is regulated, independently thereof, to the suction pressure or to the coolant temperature upstream of the high voltage store. By contrast, when a simultaneous HVS cooling mode and air-conditioning cooling mode, the two components are controlled depending on the air temperature; specifically, in this case the compressor is regulated to the setpoint air temperature at the evaporator and the expansion valve is activated depending on whether and also how much the regulating deviation of the air temperature lies below an upper limit.

In an advantageous refinement, the control system is designed such that a high pressure limit is set if the air-conditioning heating mode is set, whereas, however, the air-conditioning cooling mode is not set. The high pressure limit is expediently likewise set if the HVS cooling mode is active. By means of the high pressure limit, the compressor of the refrigeration circuit is limited to a maximum high pressure of the refrigerant downstream of the compressor.

In other words, the compressor is limited in terms of high pressure. As a result, the compressor is advantageously protected against an impermissible operating state.

For the high pressure limit, the compressor is limited in terms of high pressure by means of a characteristic diagram, especially a characteristic line. The characteristic diagram contains a compressor rotational speed for the compressor as a function of a maximum high pressure. As a result, the high pressure is limited to the corresponding maximum high pressure for a certain compressor rotational speed. The characteristic diagram contains specifically the compressor rotational speed and not merely a limiting factor. The characteristic diagram is distinguished in that the compressor rotational speed drops as the high pressure rises, and therefore, as the high pressure rises, a lower compressor rotational speed is set by means of the characteristic diagram. It is therefore ensured by the characteristic diagram, depending on the high pressure, that a maximumly permissible compressor rotational speed is not exceeded, and therefore the high pressure does not rise further, but rather is limited to a maximum high pressure.

As an alternative to the described characteristic diagram, the high pressure limit is realized by means of a regulator which is a sixth regulator and which is also referred to as a limit regulator and regulates the compressor rotational speed of the compressor such that the maximum high pressure is not exceeded. The regulator is part of the control system. An actual high pressure of the refrigerant is supplied to the regulator downstream of the compressor as the guide variable. The actual high pressure is expediently measured in the refrigeration circuit downstream of the compressor by means of a pressure sensor. The compressor rotational speed serves as the actuating variable of the limit regulator. The maximum high pressure which, for example, is fixedly predetermined or is extracted from a characteristic diagram serves as the regulating variable. In general, by means of the high pressure limit, an impermissible loading of the compressor is avoided. This is advantageous especially in the air-conditioning heating mode with a high heating circuit setpoint temperature, for example in winter. In general, during the operation of the refrigeration circuit, the high pressure increases as the heating circuit setpoint temperature increases, and becomes increasingly inefficient. The extent of this effect is dependent on the refrigerant used. However, it is conventionally expedient to avoid an increase in the high pressure beyond 20 to 24 bar. Other values may also be suitable depending on the application and specific configuration of the heating system.

In the method for operating a heating system of an electric or hybrid vehicle, by means of a control system as described above, when a cooling requirement for a passenger compartment of the vehicle, an air-conditioning cooling mode of the heating system is set, for cooling the passenger compartment by means of an air-conditioning evaporator of the heating system, when a cooling requirement for a high voltage store of the vehicle, a HVS cooling mode of the heating system is set, for cooling the high voltage store by means of a chiller of the heating system, and a component of a refrigeration circuit of the heating system is regulated depending on a regulating variable which is selected from different regulating variables depending on whether the air-conditioning cooling mode or the HVS cooling mode or both simultaneously are set.

The object is also achieved by an electric or hybrid vehicle with a control system as described above. The object is furthermore also achieved by the use of a control system as described in an electric or hybrid vehicle. Furthermore, the object is also achieved by a heating system in combination with a control system as described, wherein the components activated by the control system are then in each case parts of the heating system.

Other objects, advantages and novel features of the present subject matter will become apparent from the following detailed description of one or more preferred embodiments when considered in conjunction with the accompanying drawings.

BRIEF DESCRIPTION OF THE DRAWINGS

FIG. 1 shows a heating system and a control system.
FIG. 2 shows a refrigeration circuit of the heating system.
FIG. 3 shows a refrigeration circuit.

DETAILED DESCRIPTION OF THE DRAWINGS

Figure 4:
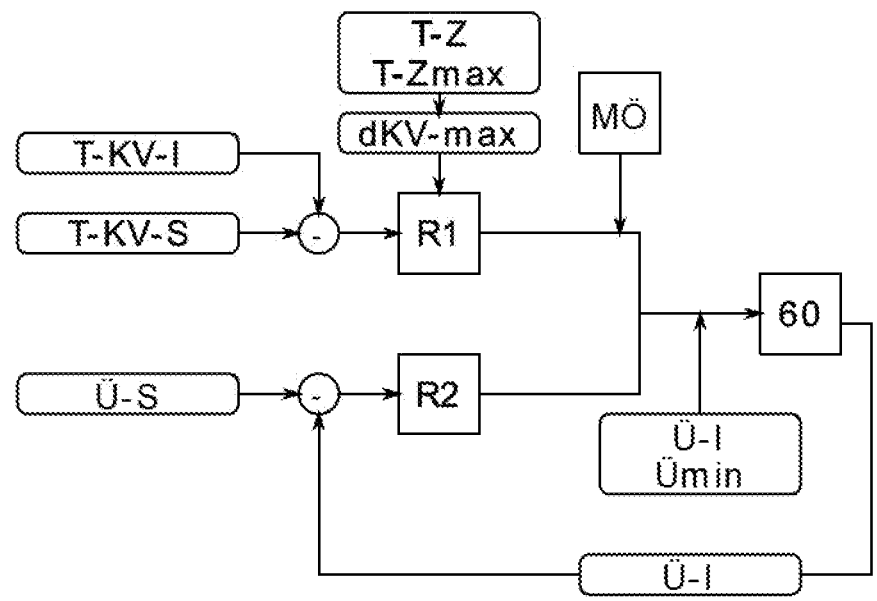
FIG. 4 shows a regulating concept for an expansion valve of the heating system.

FIG. 1 shows a heating system 2 and a control system 4 for controlling diverse components of the heating system 2. The heating system 2 is designed for use in an electric or hybrid vehicle (not shown specifically) which is also referred to merely as vehicle. The heating system 2 has an overall cooling circuit 6 and a refrigeration circuit 8 which is not illustrated in FIG. 1.

In the example embodiment shown, the overall cooling circuit 6 has a plurality of circuits 10, 12, 14, namely a cooling circuit 10, a HVS circuit 12 and a heating circuit 14. A high voltage store 16 is connected to the HVS circuit 12, for supplying an electric drive train of the electric or hybrid vehicle. Furthermore, a HVS auxiliary heater 18 is connected to the HVS circuit 12, said auxiliary heater, however, being omitted in one variant (not shown). Furthermore, a chiller 20 is connected to the HVS circuit 12 and is also connected to the refrigeration circuit 8. Furthermore, a HVS circuit pump 22, for circulating coolant, is arranged in the HVS circuit 12. The high voltage store 16 is fluidically encapsulated by a HVS shut-off valve (not denoted) in combination with a HVS nonreturn valve (likewise not denoted).

A heat source 24 of the vehicle is connected to the cooling circuit 10. The heat source 24 is, for example, an electric engine of the vehicle or power electronics or charging electronics. Downstream of the heat source 24, a first environment cooler 26 is connected to the cooling circuit 8, for exchanging heat with the environment. In the example embodiment shown, the first environment cooler 26 is combined with a second environment cooler 28 to form a cooler package. In principle, however, a configuration without the second environment cooler 28 is also possible. Furthermore, a cooling circuit pump 30 is arranged in the cooling circuit 10, here downstream of the first environment cooler 26 and upstream of the heat source 24.

The heating circuit 14 serves for controlling the temperature of the passenger compartment. A heating heat exchanger 32 is connected to the heating circuit 14, for heating passenger compartment air for a passenger compartment 34 of the vehicle. Furthermore, a condenser 36 is connected to the heating circuit 14. The condenser 36 is also connected to the refrigeration circuit 8 and, together with the chiller 20, form a heat pump which is designed to transmit heat from the chiller 20 into the heating circuit 14. Furthermore, a heating circuit pump 38 and an auxiliary heater 40 are arranged in the heating circuit 14. In the example embodiment shown, the condenser 36, the heating circuit pump 38, the auxiliary heater 40 and the heating heat exchanger 32 are arranged in the sequence mentioned downstream of one another on a main strand of the heating circuit 14. The circuit is then closed via a return strand of the heating circuit 14 and circulation of coolant is enabled. Only a nonreturn valve, not denoted specifically, is arranged in the return strand. The heating circuit 14 is connected to the cooling circuit 10 via a heating circuit flow pipe 42 and a heating circuit return pipe 44 such that the main strand and the components connected thereto are arranged in series with the first environment cooler 26.

The HVS circuit 12 is likewise attached to the cooling circuit 8, but not to the heating circuit 14. The HVS circuit 12 is connected upstream and downstream of the heat source 24 and downstream of the chiller 20. As a result, a series connection or a parallel connection of the high voltage store 16 and of the heat source 24 is optionally possible.

A cooler branch 46, from which an LT branch 48 and a HT branch 50 extend, is formed downstream of the first environment cooler 26, wherein the HT branch 50 forms a flow pipe for the heat source 24, and wherein the LT branch 48 is connected to the HVS circuit 12 downstream of the chiller 20. The second environment cooler 28 is also connected to the LT branch 48 upstream of the HVS circuit 12. In the present case, the heating circuit 14 is also connected to the LT branch 48 via the heating circuit flow pipe 42.

The heating system 2 furthermore has an equalizing volume 52 for the coolant. Furthermore, in the overall cooling circuit 2, temperature sensors 54 are connected at diverse points, for measuring the temperature of the coolant.

For the temperature control of the passenger compartment, the heating system 2 additionally has an air-conditioning evaporator 56 which is connected to the refrigeration circuit 8. As shown in FIGS. 2 and 3, the air-conditioning evaporator 56 is connected parallel to the chiller 20 in the refrigeration circuit 8. In order to set the cooling power of the air-conditioning evaporator 56, an expansion valve 58 is connected upstream of the latter. An expansion valve 60 is likewise connected upstream of the chiller 20. The heating heat exchanger 32 and the air-conditioning evaporator 56 together form an air-conditioning apparatus by means of which the passenger compartment 34 can be heated and cooled and also dehumidified.

In the variants of FIGS. 2 and 3, the refrigeration circuit 8 has a compressor 62, a plurality of evaporators, namely the air-conditioning evaporator 56 and the chiller 20, and furthermore the condenser 36. The refrigeration circuit 8 in FIG. 2 additionally has two inner heat exchangers 64, one each for the air-conditioning evaporator 56 and the chiller 20. In the variant of FIG. 3, only an inner heat exchanger 64 is arranged for the two evaporators. A nonreturn valve (not denoted specifically) is arranged downstream of the air-conditioning evaporator 56 and, in the variant of FIG. 2, can also be arranged upstream of the inner heat exchanger 64. In a variant which is not shown, an inner heat exchanger 64 is not present.

In order to switch over the heating system 2 between diverse switching states and in order to set various operating modes, various valves 66, 68, 70, 72 are arranged in the overall cooling circuit 4. A shut-off valve 66 in the heating circuit flow pipe 42 serves for shutting off the heating circuit 14, i.e. for opening or for closing same. Alternatively, the shut-off valve 66 is arranged in the heating circuit return pipe 44. Furthermore, three 3/2-way valves 68, 70, 72 are arranged which, depending on the switching position, permit diverse series and parallel connections of first environment cooler 26, chiller 20, heat source 24 and high voltage store 16. Thus, for example, a HVS heating mode is possible, in which the chiller 20, the heat source 24 and the high voltage store 16 are connected in series. A series connection of chiller 20 and high voltage store 16 and, parallel thereto and independently thereof, a series connection consisting of heat source 24 and first environment cooler 26, is also possible for a HVS cooling mode or a heat source cooling mode. Also possible is a series connection consisting of heat source 24, chiller 20 and first environment cooler 26, wherein the high voltage store 16 is then connected parallel to the first environment cooler 26 and the heat source 24. In addition, a switching state is also possible, in which the heat source 24 is connected parallel to a series connection consisting of second environment cooler 28, chiller 20 and high voltage store 16. The heating circuit 14 can be shut off in each case independently thereof.

The control system 4 is designed such that, when a cooling requirement for the passenger compartment 34, an air-conditioning cooling mode of the heating system 2 is set, for cooling the passenger compartment by means of the air-conditioning evaporator 56, and that, when a cooling requirement for the high voltage store 16, a HVS cooling mode is set, for cooling the high voltage store 16 by means of a chiller 20. The components of the heating system 2 that are necessary for this purpose are correspondingly activated by means of the control system 4. The air-conditioning cooling mode and the HVS cooling mode are in each case an operating mode of the heating system 2. Furthermore, the refrigeration circuit 8 is activated depending on whether the air-conditioning cooling mode or the HVS cooling mode or both simultaneously is or are set. In the example embodiment shown, depending on which operating modes are activated, the compressor 62 and the expansion valve 60 of the chiller 20 are activated in a manner suitable for requirements.

In addition to the HVS cooling mode and the air-conditioning cooling mode, an air-conditioning heating mode for the heating system 2 can also be set here by means of the heating circuit 14. In the air-conditioning heating mode, heat is transmitted into a heating circuit 14 by means of the heat pump in order to heat the passenger compartment. In a variant which is not shown, the passenger compartment air is heated directly by means of the condenser 36. When a cooling requirement for the passenger compartment 34, the latter is cooled by means of the air-conditioning evaporator 56. When a heating requirement, the passenger compartment 34 is heated by means of the heating heat exchanger 32. When a dehumidification requirement for dehumidifying the passenger compartment 34, both a heating requirement and a cooling requirement are present simultaneously. The air-conditioning evaporator 56 and the heating heat exchanger 32 are arranged together in an air path, not shown specifically, through which passenger compartment air flows during the operation, i.e. air which is supplied to the passenger compartment. Said passenger compartment air then correspondingly exchanges heat with the air-conditioning evaporator 56 and the heating heat exchanger 32, depending on the operating mode.

When a cooling requirement for the passenger compartment 34 without an additional heating requirement for the passenger compartment 34, the heating circuit 14 is opened, the chiller 20 of the heat pump is deactivated and an air-conditioning cooling mode is thereby set. The air-conditioning evaporator 56 absorbs heat from the passenger compartment air, transfers said heat via the condenser 36 into the heating circuit 14 and from there to the environment cooler 26, 28 in the cooling circuit 8 and to the environment. In the reverse case of a heating requirement without an additional cooling requirement, the heating circuit 14 by contrast is closed, heat is supplied to the heating heat exchanger 32 via the condenser 36 of the heat pump and an air-conditioning heating mode is thereby set. The heat originates here, for example, from the environment and is absorbed via the environment coolers 26, 28 or originates from a component which is connected to the overall cooling circuit 6, for example from the high voltage store 16, the HVS auxiliary heater 18 or the heat source 24.

The simultaneous cooling of the high voltage store 16 and of the passenger compartment 34 is a particular challenge since, in this case, both the HVS cooling mode and the air-conditioning cooling mode are activated and therefore two evaporators are operated simultaneously in the refrigeration circuit 8. In this situation, the air-conditioning evaporator 56 and the chiller 20 compete for the refrigeration power which is applied by the compressor 62. The compressor 62 is operated at a certain compressor rotational speed VD which can be set by means of the control system 4 in order to set the refrigeration power which is available overall. The division of the refrigeration power between the air-conditioning evaporator 56 and the chiller 20 arises from the ratio of the openings of the two expansion valves 58, 60. In the present case, an expansion valve 60 which can be shut off and can be controlled electrically, EXV for short, is connected upstream of the chiller 20. By contrast, a thermal expansion valve 58, TXV for short, which is simple and cost-effective in comparison thereto is connected upstream of the air-conditioning compressor 56.

The control of the expansion valve 60 by the control system 4 depending on the activated operating modes is illustrated in FIG. 4. If the HVS cooling mode is set in combination with the air-conditioning cooling mode, the difference between the air temperature T-KV-I and the setpoint air temperature T-KV-S at the air-conditioning evaporator 56 serves as a control variable for a control R1. If the HVS cooling mode is set, but the air-conditioning cooling mode is not, the superheating Ü-I of the refrigerant in the refrigeration circuit 8 serves as a regulating variable for a regulator R2. The associated guide variable corresponds to a setpoint superheating Ü-S which, for example, is extracted from a characteristic diagram, not shown specifically, depending on one or more other parameters.

In the pure HVS cooling mode, i.e. without an air-conditioning cooling mode, all of the refrigeration power is used for cooling the high voltage store 16. The refrigeration power itself is set by means of the compressor rotational speed VD, likewise shown here within the scope of a regulation, as in FIG. 5, and explained in more detail further below. The expansion valve 60 is then regulated with the superheating Ü-I as the regulating variable to the setpoint superheating Ü-S as the guide variable. An opening of the expansion valve 60 serves as the actuating variable. The air-conditioning evaporator 56 is deactivated here by the associated expansion valve 58 being shut off.

In the pure air-conditioning cooling mode, i.e. without the HVS cooling mode, first of all the compressor rotational speed VD and therefore also the refrigeration power are regulated to the air temperature T-KV-I. The refrigeration power is therefore set effectively depending on the cooling requirement for the passenger compartment 34. The expansion valve 58 of the air-conditioning evaporator 56 is not regulated here. The expansion valve 60 of the chiller 20 is closed.

If, however, both the air-conditioning cooling mode and the HVS cooling mode are active, the expansion valve 60 is regulated depending on the air temperature T-KV-I. Owing to the regulation of the compressor 62 in conjunction with the air-conditioning cooling mode, a corresponding compensation optionally takes place by means of an increase of the compressor rotational speed VD. By means of said regulation of the compressor 62 depending on the air temperature T-KV-I, it is first of all ensured that the cooling requirement for the passenger compartment 34 is optimally satisfied. The cooling of the high voltage store 16 takes place additionally with respect thereto depending on the air temperature T-KV-I such that an optimum cooling of the passenger compartment continues to be ensured. By controlling the expansion valve 60 depending on the air temperature T-KV-I, it is avoided that undesirable deficits in the cooling of the passenger compartment occur because of the branching off of refrigeration power for the high voltage store 16. The HVS cooling mode is therefore initially subordinate to the air-conditioning cooling mode.

For the situation in which the HVS cooling mode is set in combination with the air-conditioning cooling mode, i.e. when the control R1 is active, in the example embodiment shown in FIG. 4, a minimum opening MÖ of the expansion valve 60 is set which is then also not fallen short of by means of the control R1. By setting the minimum opening MÖ, a minimum cooling for the high voltage store 16 is ensured. Starting from the minimum opening MÖ, the expansion valve 60 is then opened further only when the air temperature T-KV-I corresponds to the setpoint air temperature T-KV-S within a tolerance and when further cooling because of the cell temperature is necessary. It is thereby ensured that the air-conditioning cooling mode is optimally carried out before further refrigeration power is then used for the HVS cooling mode.

Overall, in the present case, the air-conditioning cooling mode is prioritized over the HVS cooling mode by the expansion valve 60 only being opened further if a regulating deviation of the air temperature T-KV-I lies within a maximum deviation dKV-max. The regulating deviation corresponds to the difference between the air temperature T-KV-I and the setpoint air temperature T-KV-S. The maximum deviation dKV-max indicates which extent of deviation is still acceptable and which comfort losses in the passenger compartment 34 are still tolerable. Starting from a minimum cooling for the high voltage store 16 by means of the minimum opening MÖ, first of all the air-conditioning cooling mode is therefore prioritized over the HVS cooling mode. Only while satisfying the cooling requirement for the passenger compartment 34 is then more refrigeration power shared with the chiller 20 by further opening of the expansion valve 60, in order to more strongly cool the high voltage store 16 if there is a need for this.

If a cell temperature T-Z of the high voltage store 16 exceeds a maximum temperature T-Zmax, conversely the HVS cooling mode is prioritized over the air-conditioning cooling mode by the maximum deviation dKV-max being increased. This serves to protect the high voltage store 16 against too high a cell temperature and against corresponding damage or aging effects. When the maximum temperature T-Zmax is exceeded, the control of the expansion valve 60 is assisted by raising the permitted regulating deviation for the air temperature T-KV-I. In other words: the maximum deviation dKV-max is increased and, for example, depending on the cell temperature T-Z, extracted from a characteristic diagram, not shown specifically.

As FIG. 4 clarifies, in the present case the expansion valve 60 is not opened further or is even closed if the superheating Ü-I falls below a minimum superheating Ümin.

In the example embodiment shown, the compressor 62 is also regulated depending on the operating mode. The regulation shown is based on the regulation shown in FIG. 2 of DE 10 2015 218 825 A1, which is mentioned at the beginning, wherein, however, some details have been omitted for the sake of clarity. In each case, the control variable is the compressor rotational speed VD which decisively determines the power applied by the compressor 62. In principle, the regulation first of all takes place via two regulators R3, R4, of which only one is selected. During the air-conditioning cooling mode or a combination thereof with the air-conditioning heating mode, use is made of the regulator R3 which regulates the compressor 62 depending on the air temperature T-KV-I at the air-conditioning evaporator 56. By contrast, during the pure air-conditioning heating mode, use is made of the regulator R4 which regulates the compressor 62 depending on a heating circuit temperature T-HK-I which indicates the temperature of the coolant in the heating circuit 14 between the condenser 36 and the heating heat exchanger 32. In a corresponding manner, the setpoint air temperature T-KV-S or a heating circuit setpoint temperature T-HK-S is used as the guide variable. In addition, in a variant which is not shown, such as in FIG. 2 of DE 10 2015 218 825 A1, there is a further regulator, for regulating the compressor 62 depending on a temperature of the coolant outside the heating circuit 14, for example a temperature of the coolant downstream of the chiller 20 and upstream of the environment coolers 26, 28. Said additional regulating distance efficiently avoids icing of the environment coolers 26, 28 by a coolant cooled too strongly in the chiller 20, by the compressor rotational speed VD being brought down in good time. Said additional regulator is then a limit regulator for the regulator R4, i.e. acts only in the pure air-conditioning heating mode.

Figure 5:
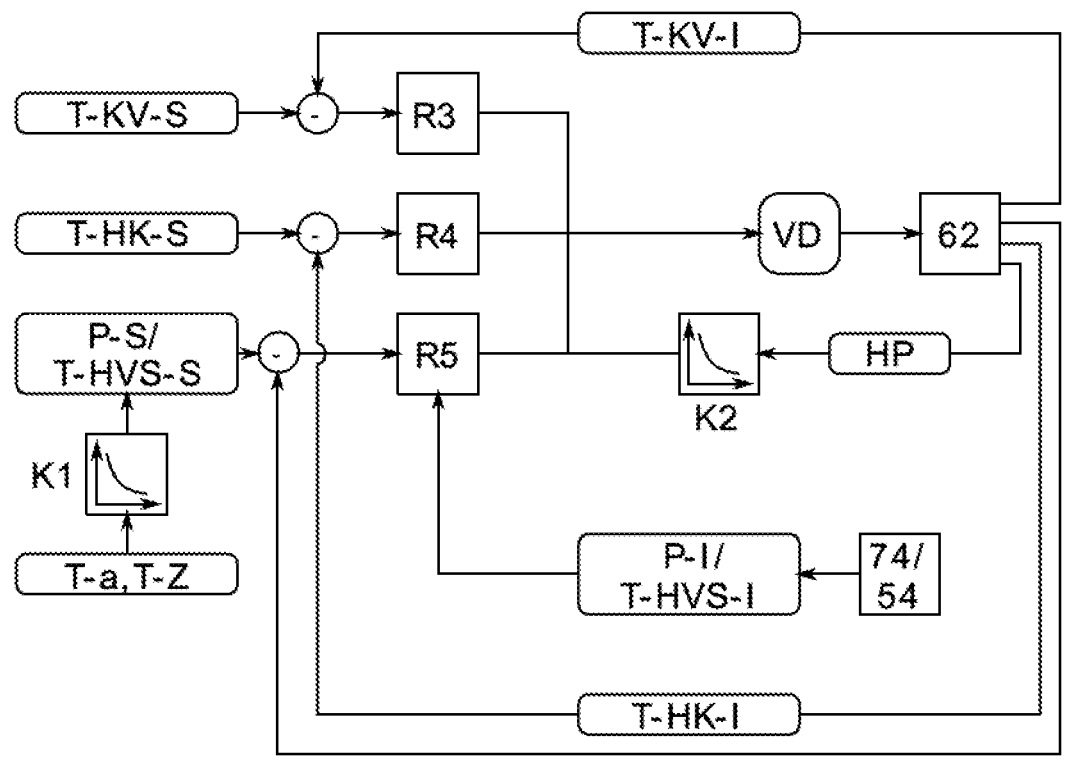
FIG. 5 shows a regulating concept for a compressor of the heating system.

In addition, FIG. 5 shows a further regulator R5 which is used if the HVS cooling mode is set, but the air-conditioning cooling mode is not, nor is an air-conditioning heating mode. In a first variant, the regulating variable is a suction pressure P-I in the refrigeration circuit 8 upstream of the compressor 62. In a second variant, the regulating variable is a coolant temperature T-HVS-I upstream of the high voltage store 16. If a passenger compartment temperature control is not required in the HVS cooling mode, the compressor 62 is accordingly activated depending on the suction pressure P-I or on the coolant temperature T-HVS-I. The suction pressure P-I is measured in the refrigeration circuit 8 upstream of the compressor 62 by means of a pressure sensor 74. The pressure sensor 74 here is even a pressure and temperature sensor. The coolant temperature T-HVS-I is optionally measured by means of the temperature sensor 54 upstream of the high voltage store 16. A setpoint suction pressure P-S or a setpoint coolant temperature T-HVS-S is correspondingly supplied as the guide variable to the regulator R5. As shown in FIG. 5, the respective setpoint value P-S, T-HVS-S is extracted here from a characteristic diagram K1 which contains the setpoint value P-S, T-HVS-S as a function of an external temperature T-a and the cell temperature T-Z.

In addition, a high pressure limit is also realized here which is set if the air conditioning heating mode is set, but the air conditioning cooling mode and the HVS cooling mode are not. By means of the high pressure limit, a regulation of the compressor 62 is limited to a maximum high pressure HP max of the refrigerant downstream of the compressor 62. As a result, the compressor 62 is protected from an impermissible operating state. In the present case, the compressor 62 is limited in terms of high pressure by means of a characteristic diagram K2 which contains the compressor rotational speed VD as a function of the high pressure HP. The high pressure HP assigned to said one certain compressor rotational speed VD is then the maximum high pressure HP max. The characteristic diagram K2 specifically contains the compressor rotational speed VD which drops as the high pressure HP rises, and therefore a lower compressor rotational speed VD is set by means of the characteristic diagram K2 as the high pressure HP rises. The high pressure HP is measured in the refrigeration circuit 8 downstream of the compressor 62 by means of a pressure sensor 76. The pressure sensor 76 is designed here as a combined pressure and temperature sensor. In a variant which is not shown, a regulator for limiting the high pressure is used instead of the characteristic diagram K2.

LIST OF REFERENCE SIGNS

2 Heating system
4 Control system
6 Overall cooling circuit
8 Refrigeration circuit
10 Cooling circuit
12 HVS circuit
14 Heating circuit
16 High voltage store
18 HVS auxiliary heater
20 Chiller
22 HVS circuit pump
24 Heat source
26 First environment cooler
28 Second environment cooler
30 Cooling circuit pump
32 Heating heat exchanger
34 Passenger compartment
36 Condenser
38 Heating circuit pump
40 Auxiliary heater
42 Heating circuit flow pipe
44 Heating circuit return pipe
46 Cooler branch
48 LT branch
50 HT branch
52 Equalizing volume
54 Temperature sensor
56 Air conditioning evaporator
58 Expansion valve (of the air conditioning evaporator)
60 Expansion valve (of the chiller)
62 Compressor
64 Inner heat exchanger
66 Shut off valve
68 3/2 way valve
70 3/2 way valve
72 3/2 way valve
74 Pressure sensor
76 Pressure sensor
dKV-max Maximum deviation
HP High pressure
HP-max Maximum high pressure
K1, K2 Characteristic diagram
MÖ Minimum opening
P I Suction pressure
P S Setpoint suction pressure
R1 Control
R2,R3,R4,R5 Regulator
T a External temperature
T HK I Heating circuit temperature
T HK S Heating circuit setpoint temperature
T HVS I Coolant temperature
T HVS S Setpoint coolant temperature
T KV I Air temperature
T KV S Setpoint air temperature
T Z Cell temperature
T Zmax Maximum temperature
ÜI Superheating
Ümin Minimum superheating
ÜS Setpoint superheating
VD Compressor rotational speed The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control system for a heating system of a vehicle, with a coolant cooled high voltage store, comprising:
   an air conditioning evaporator of a refrigeration circuit of the heating system through which refrigerant circulates to cool a passenger compartment of the vehicle when a cooling requirement for the passenger compartment and for which an air conditioning cooling mode is set; and
   a chiller positioned upstream of which an expansion valve is connected in the refrigeration circuit to cool the high voltage store when a cooling requirement for the high voltage store of the vehicle and for which a high voltage store (HVS) cooling mode is set, wherein the control system is configured to:

select a regulating variable for a compressor from a plurality of different regulating variables based on whether the air conditioning cooling mode is set, whether the HVS cooling mode is set, and whether both the air conditioning cooling and HVS cooling modes are set;

activate the expansion valve depending on the selected regulating variable; and regulate the compressor of the refrigeration circuit depending on the selected regulating variable, which, when both the air conditioning cooling and HVS cooling modes are set, is a setpoint air temperature at the air conditioning evaporator; and a suction pressure in the refrigeration circuit upstream of the compressor is used as the selected regulating variable if the HVS cooling mode is set, but the air conditioning cooling mode is set not.

2. The control system according to claim 1, wherein the expansion valve is regulated with superheating of the refrigerant in the refrigeration circuit as the selected regulating variable if the HVS cooling mode is set, but the air conditioning cooling mode is not set.

3. A control system for a heating system of a vehicle, with a coolant cooled high voltage store, comprising:

an air conditioning evaporator of a refrigeration circuit of the heating system through which refrigerant circulates to cool a passenger compartment of the vehicle when a cooling requirement for the passenger compartment and for which an air conditioning cooling mode is set; and a chiller positioned upstream of which an expansion valve is connected in the refrigeration circuit to cool the high voltage store when a cooling requirement for the high voltage store of the vehicle and for which a high voltage store (HVS) cooling mode is set, wherein the control system is configured to:

select a regulating variable for a compressor from a plurality of different regulating variables based on whether the air conditioning cooling mode is set, whether the HVS cooling mode is set, and whether both the air conditioning cooling and HVS cooling modes are set, activate the expansion valve depending on the selected regulating variable, and regulate the compressor of the refrigeration circuit depending on the selected regulating variable, which, when both the air conditioning cooling and HVS cooling modes are set, is a setpoint air temperature at the air conditioning evaporator; and when the HVS cooling and the air conditioning cooling modes are both set, the expansion valve is activated depending on the selected regulating variable for the compressor by a difference between an air temperature at the air conditioning evaporator and the setpoint air temperature.

4. The control system according to claim 2, wherein when the HVS cooling and the air conditioning cooling modes are both set, the expansion valve is activated depending on the selected regulating variable for the compressor by a difference between an air temperature at the air conditioning evaporator and the setpoint air temperature.

5. The control system according to claim 3, wherein the air conditioning cooling mode is prioritized over the HVS cooling mode by the expansion valve being opened further whenever the difference lies within a maximum deviation.

6. The control system according to claim 5, wherein when a cell temperature of the high voltage store exceeds a maximum temperature, the HVS cooling mode is prioritized over the air conditioning cooling mode by the maximum deviation being increased.

7. The control system according to claim 1, wherein when the HVS cooling mode is set in combination with the air conditioning cooling mode, a minimum opening of the expansion valve is set; and the expansion valve is opened starting from the minimum opening depending on one or more of:
a difference between air temperature and setpoint air temperature; and
a cell temperature of the high voltage store.

8. The control system according to claim 1, wherein the expansion valve is not opened further or is closed if a superheating of the refrigerant in the refrigeration circuit falls short of a minimum superheating.

9. The control system according to claim 1, wherein a coolant temperature upstream of the high voltage store is used as the selected regulating variable if the HVS cooling mode is set, but the air conditioning cooling mode is not set.

10. The control system according to claim 1, wherein when the HVS cooling mode is set and the air conditioning cooling mode is not set, a setpoint value for regulating the compressor is extracted from a characteristic diagram which contains the setpoint value as a function of one or more of:
an external temperature; and
a cell temperature of the high voltage store.

11. The control system according to claim 9, wherein when the HVS cooling mode is set and the air conditioning cooling mode is not set, a setpoint value for regulating the compressor is extracted from a characteristic diagram which contains the setpoint value as a function of one or more of:
an external temperature; and
a cell temperature of the high voltage store.

12. The control system according to claim 1, wherein when a heating requirement for the passenger compartment of the vehicle, an air conditioning heating mode of the heating system is set for heating the passenger compartment by means of a heating circuit of the heating system; and a high pressure limit is set if the air conditioning heating mode is set, but the air conditioning cooling mode is not, wherein
the compressor of the refrigeration circuit is limited to a maximum high pressure via a high pressure limit of the refrigerant downstream of the compressor.

13. The control system according to claim 12, wherein the high pressure limit is realized by a characteristic diagram that contains a compressor rotational speed for the compressor as a function of the maximum high pressure.

14. The control system according to claim 12, wherein the high pressure limit is realized by a regulator that regulates a compressor rotational speed of the compressor such that a maximum high pressure is not exceeded.

15. A method for operating a heating system of a vehicle using a control system, the method comprising:
- setting an air conditioning cooling mode by using an air conditioning evaporator of a refrigeration circuit of the heating system, for cooling a passenger compartment of the vehicle when a cooling requirement for the passenger compartment of the vehicle is set;
- setting a high voltage store (HVS) cooling mode by using a chiller of the heating system for cooling the high voltage store when a cooling requirement for a high voltage store of the vehicle, wherein
  - an expansion valve is connected in the refrigeration circuit upstream of the chiller;
- selecting, from a plurality of different regulating variables, a regulating variable for a compressor based on whether the air conditioning cooling mode is set, whether the HVS cooling mode is set, and whether both the air conditioning cooling and HVS cooling modes are set;
- activating the expansion valve depending on the selected regulating variable; and
- regulating the compressor of the refrigeration circuit depending on the selected regulating variable, wherein
  - the selected regulating variable is a setpoint air temperature at the air conditioning evaporator when both the air conditioning cooling and HVS cooling modes are set, and
  - a suction pressure in the refrigeration circuit upstream of the compressor is used as the selected regulating variable if the HVS cooling mode is set, but the air conditioning cooling mode is set not.

* * * * *